United States Patent [19]

Chen

[11] 4,255,891
[45] Mar. 17, 1981

[54] AUTOMATIC ANIMAL-TRAPPING DEVICE

[76] Inventor: Chang C. Chen, No. 7, 12 La., Tsuey Hwa St., Pan Chiao Shih, Taipei Hsien, Taiwan

[21] Appl. No.: 43,932

[22] Filed: May 30, 1979

[51] Int. Cl.³ .................... A01M 23/04; A01M 23/14
[52] U.S. Cl. ........................................ 43/64; 43/68; 43/69
[58] Field of Search ................... 43/64, 68, 69, 71, 73, 43/74, 58

[56] References Cited
U.S. PATENT DOCUMENTS

| 874,335 | 12/1907 | Harden | 43/73 |
| 1,126,801 | 2/1915 | Lowery | 43/68 X |
| 1,465,328 | 8/1923 | Strong | 43/68 |
| 1,740,583 | 12/1929 | Fisher | 43/68 |
| 2,273,008 | 2/1942 | Fisher | 43/68 |
| 2,464,090 | 3/1949 | Jordan | 43/68 |

Primary Examiner—Nicholas P. Godici
Attorney, Agent, or Firm—Karl W. Flocks

[57] ABSTRACT

The present invention is to provide an automatic animal-trapping device, more particularly, to provide a kind of animal-trapping device, used for trapping mice and other like wild animals, which may repeat its operating cycle all over again and catch lots of mice in continuity with special functions of its automatic control mechanisms.

9 Claims, 9 Drawing Figures

U.S. Patent  Mar. 17, 1981  Sheet 2 of 2  4,255,891
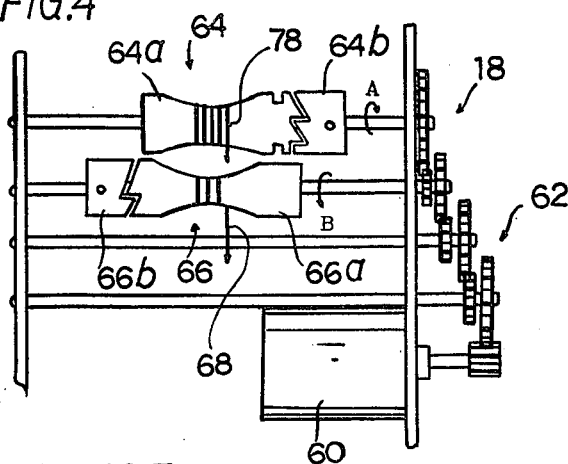
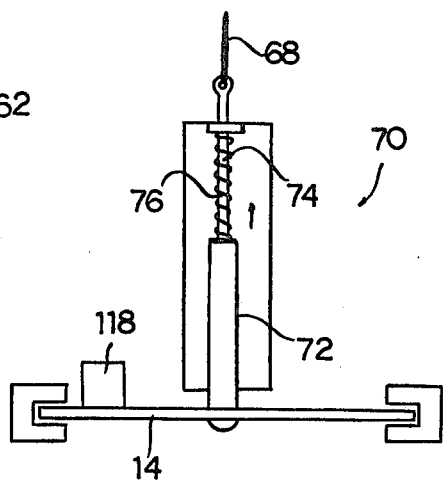
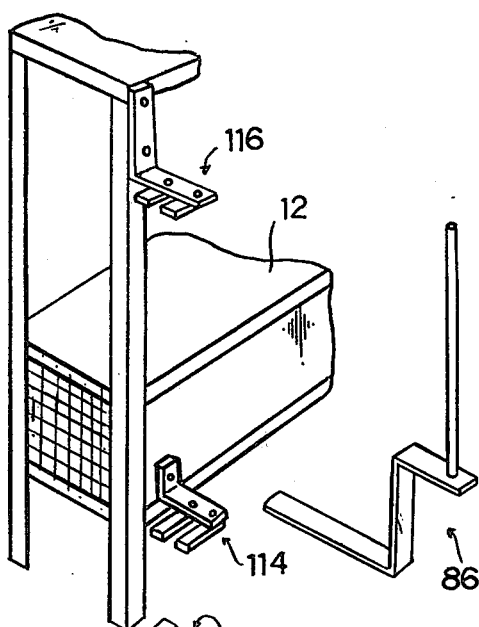
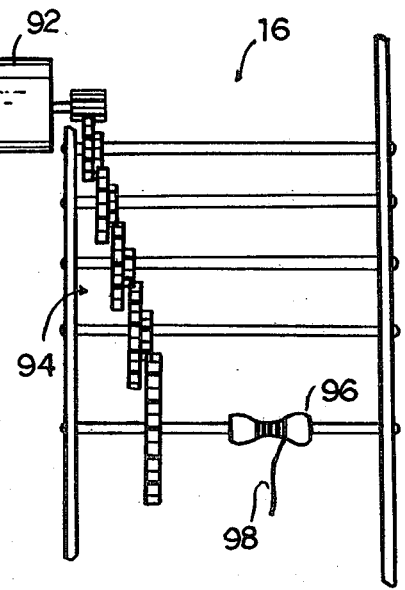
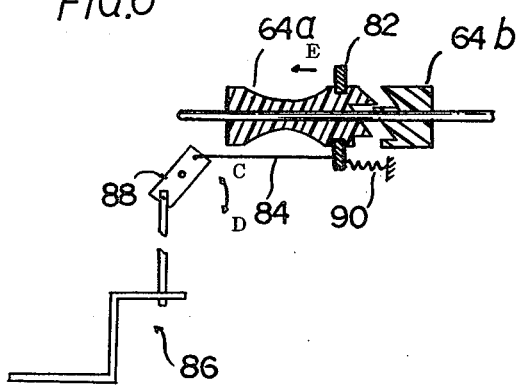
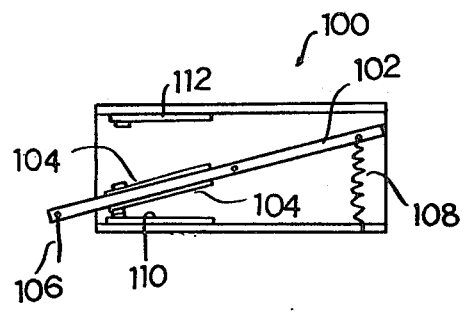

4,255,891

AUTOMATIC ANIMAL-TRAPPING DEVICE

SUMMARY OF THE INVENTION

The present invention relates to an automatic animal-trapping device, more particularly, to a kind of animal-trapping device, used for trapping mouse and other like wild animals, which may repeat its operating cycle all over again and catch lots of mice in continuity with special functions of its automatic control mechanisms.

Heretofore, many types of mouse(animal)-trapping device have been disclosed for practical use, notwithstanding neither type of them has been proposed with automatic control mechanism and special design.

Therefore, after catching one mouse any one of said conventional mouse(animal)-trapping device will automatically block its mechanism and lose its mechanial function so that it can't catch lots of mice with a continuity of operation.

It is therefore the primary object of the present invention to overcome these drawbacks to provide an automatic animal-trapping device having novel construction which certainly has an improved effect.

Another object of the present invention is to provide an automatic animal-trapping device which has many sets of automatic control mechanisms. When the animal-trapping device catches one mouse, the device will automatically close its entrance and transport the trapped mouse into a confinement cell by means of transporting mechanism of an elevator. After that, the device will then automatically open its entrance and also restore control functions of all automatic control mechanisms.

A further object of the present invention is to disclose an automatic animal-trapping device which has the advantage of automatic control operation.

DESCRIPTION OF THE DRAWINGS

FIG. 4 is a view showing a control mechanism for a lifting plate in accordance with the present invention.

FIG. 5 is a view showing a relative position between a control rod mechanism and the lifting plate in accordance with this invention.

FIG. 6 is a showing a relative position between the first clutching-pulley and a linkge.

FIG. 7 is a partial perspective view of the elevator of the automatic animal-trapping device in accordance with the present invention.

FIG. 8 is a view of the control mechanism for the elevator in accordance with the invention.

FIG. 9 is a view showing an electric switch.

DETAILED DESCRIPTION

Figure 1:
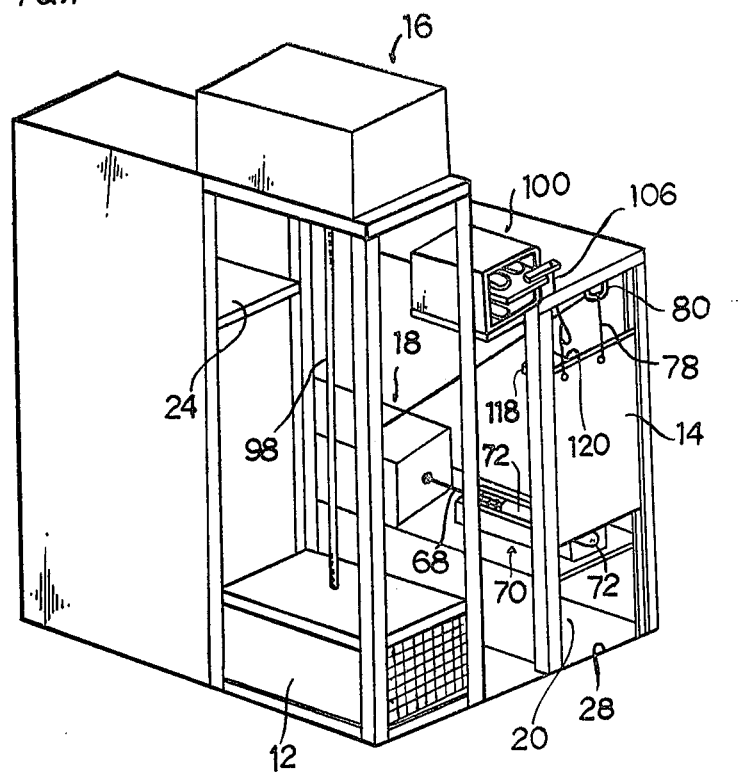
FIG. 1 is a perspective view of an automatic animal-trapping device of the present invention.

Referring to the Figures, the automatic animal-trapping device of the present invention is mainly composed of a hallway mechanism 10, an elevator 12, a lifting plate 14, an automatic control mechanism 16 for the elevator, and an automatic control mechanism 18 for the lifting plate.

Figure 2:
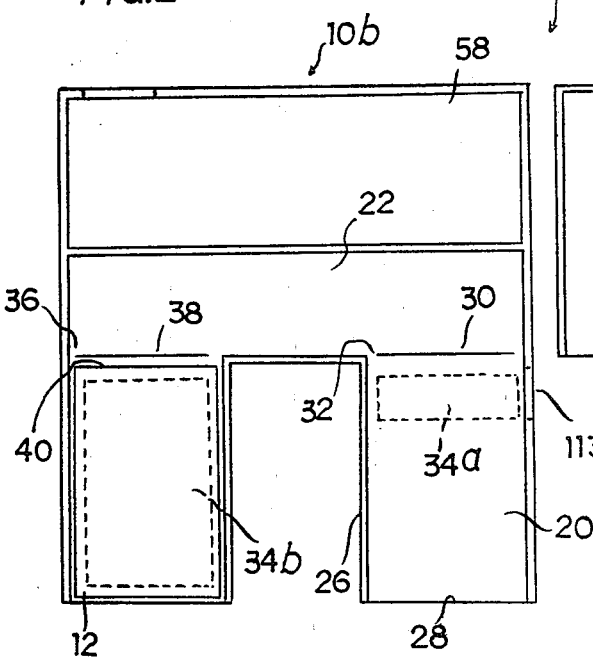
FIG. 2 is a view indicating the lower compartment of the hallway mechanism in accordance with the automatic animal-trapping device of the present invention.
Figure 3:
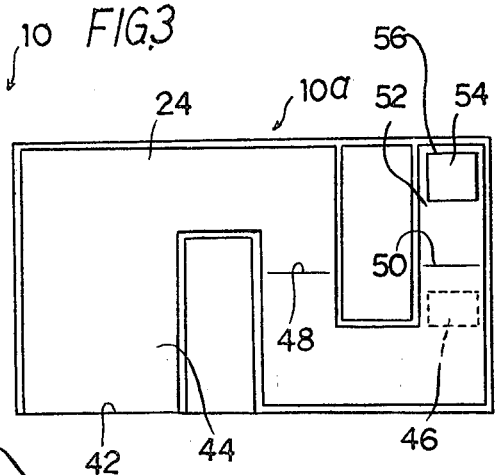
FIG. 3 is a view indicating the upper compartment of the hallway mechanism in accordance with the automatic animal-trapping device of the present invention.

As shown in FIGS. 1–3, the hallway mechanism 10 is divided into two parts which are the upper compartment 10a, to be the third hallway 24, and the lower compartment 10b including the first hallway 20 and the second hallway 22. The first hallway 20 is a casing 26 opened at its both opposing ends, in which the front entrance 28 opened at front end is equipped with a lifting plate 14 able to be automatically controlled in its rise and the fall and the rear entrance opened at the other end is equipped with a turning plate 30 capable of opening and closing in the same one direction, in which the rear entrance is communicated with the first opening 32 of the second hallway 22. In the inner side of the casing 26, bait can be placed for luring mice, and a pedal switch 34a is set for controlling the fall of the lifting plate 14. The second opening 36 of the second hallway 22 is also equipped with a turning plate 38 capable of opening and closing in the same one direction, in which said second opening 36 may properly communicate with and correspond to the opening 40 of the elevator 12 able to lift up and lower down when the elevator 12 lowers down completely to the lower compartment 10b.

Third hallway 24 is to be a housing 44 having an opening 42 the size of which may be also properly communicating with and corresponding to the opening 40 of the elevator 12. Also shown are two respective turning plates 48, 50, which are all capable of opening and closing in the same one direction, and a pedal switch 46 used for controlling the rise of the lifting plate 14 and the fall of the elevator 12 within the inner side of the housing 44. The inner room 52 within the housing 44 has a port 56 comprising a turning plate 54 so that mice will fall into the confinement cell 58 in the lower compartment 10b from the port 56 when they bump away the turning plate 54 through carelessness.

Referring now specifically to FIG. 4, the automatic control mechanism 18 for the lifting plate 14 performs by means of a motor 60 to drive a first clutching-pulley 64 and a second clutching-pulley 66 rotating respectively along the arrow A and B direction through a transmission gear set 62. The driven pulley 66a of the second clutching-pulley 66 is wound round by a steel wire 68 connected at its other end to the extending portion 74 of the control rod 72 belonging to the control mechanism 70. A coil compressed spring 76 is provided on said extending portion 74. Therefore, when the motor 60 is operating and power transmitted to drive the driving pulley 66b of the second clutching-pulley 66 which will be involved to make the driven pulley 66a rotate in the arrow B direction, the steel wire 68 will be pulled to retract the control rod 72 along the arrow direction appearing in FIG. 5. However, the driving pulley 66b doesn't engage with the driven pulley 66a in face to face relationship, thus the driven pulley 66a will be running idle after being moved by the driving pulley 66b to run one pitch to retract the control rod 72, and then the control rod 72 will move back to its original position by means of the function of the restitutive force of the coil compressed spring 76. The driven pulley 66a of the first clutching-pulley 64 is also wound round by a steel wire 78 connected to its other end, penetrating a fixed hole 80, to the upper side of the lifting plate 14. Therefore, when the motor 60 operates through the transmission gear set 62 to drive the driving pulley 64b of the first clutching-pulley 64 which will be involved to rotate the driven pulley 64a in the arrow A direction, the driven pulley 64a will then roll up the steel wire 78 and lift up the lifting plate 14. Furthermore, referring to FIG. 6, the driven pulley 64a of the first clutching-pulley 64 is equipped with a ring 82 having a connecting rod 84 connected to the front end of the crank 88 which is capable of pivoting up and down in the space between C and D under the function of a linkage 86 to which the other end of the crank 88 is connected. As a result of this construction, the linkage 86 will shift downward under pressure of the elevator 12 when the elevator 12 lowers down to the lower compartment 10b so as to make the crank 88 rotate in the arrow c direction and force the driven pulley 64a shifting in E direction to retract the said driven pulley 64a from the engaging position with the driving pulley 64b. At this moment, when the motor 60 is switched on to operate, the driven pulley 64a will be turning idle and the second clutching-pulley 66 will be run to retract the control rod 72 as above mentioned so that the lifting plate 14 laid on the front end of said control rod 72 will automatically slip down, which will pull the steel wire 78 to make the driven pulley 64a turn idle freely in counterclockwise arrow A direction and then loosen the steel wire 78. However, the force on the linkage 86 disappears when the elevator 12 lifts up, the driven pulley 64a will be therefore back to its engaging position with the driving pulley 64b under the function of the tensive force of a tension spring 90.

As shown in FIG. 8, the automatic control mechanism 16 for the elevator includes a transmission gear set 94, operated by means of the motor 92, which is used for rotating the pulley 96 wound round by a steel wire 98. The other end of the steel wire 98 is fixed on the upper side of the elevator 12. Thus, when the motor 92 operates to rotate said pulley 96 in clockwise direction by controlling an electric switch 100, the steel wire 98 will be rolled up to lift up the elevator 12. On the contrary, when the motor 92 operates to rotate said pulley 96 in counterclockwise direction by controlling the electric switch 100, the elevator 12 will automatically lower down to its original position.

As indicated in FIG. 1 and FIG. 9, said electric switch 100 may change direction of electric current and magnetic force of the coil of the motor 92 by means of shifting connection of the spring plate 104 provided on the lever 102 so that it may control the motor 92 to run in either clockwise or counterclockwise direction. The lever 102 is equipped at its front end with a connecting wire 106 connected to the top side of the lifting plate 14 and at its other end with a tension spring 108. When the lifting plate 14 lowers down, the front end of the lever 102 under the function of tensive force of the connecting wire 106 shifts downward to make the spring plate 104 capable of contact with the lower spring plate 110. Therefore, the motor 92 will operate and be transmitted to rotate the pulley 96 in clockwise direction to lift up the elevator 12. And when the lifting plate 14 lifts up, the tensive force on the front end of the lever 102 disappears and then said front end will shift upward under the function of tensive force of the tension spring 108 on the other end of the lever 102, which will make the spring plate 104 capable of contact with the upper spring plate 112. The motor 92 will then operate and be caused to rotate the pulley 96 in a counterclockwise direction to lower down the elevator 12.

The constructions and installations of this invention have been described above in every detailed. For a further understanding of the actual operation of this invention it should have the following detailed description taken in conjunction with the accompanying drawings.

In accordance with the automatic animal-trapping device of the present invention, a door-wing 113 able to be arbitrarily opened and closed is mounted on the outer side of the casing 26 of the first hallway 20 so that the door-wing may be opened to place bait in the first hallway 20 for luring mice entering into the first hallway 20 from the front entrance 28 in the front end of the casing 26. When one mouse steps on the pedal switch 34a, said pedal switch 34a will be switched on to start running the motor 60 driving the driving pulley 66b of the second clutching-pulley 66 which will involve making the driven pulley 66a rotate in the arrow B direction, and then the steel wire 68 will be pulled to retract the control rod 72. At this moment, the lifting plate 14 laid on the front end of the control rod 72 will automatically slip down and close the front entrance 28 of the first hallway 20. After that, the mouse will naturally fall into a panic and flee in a hurry into the second hallway 22 by bumping away the turning plate 30. In the second hallway 22, the mouse will naturally, once again, bump away the turning plate 38 and flee into the elevator 12 to touch (switch on) the pedal switch 34b set within the elevator 12. The motor 92, belonging to the automatic control mechanism 16 for the elevator, will then operate to make the pulley 96 rotate in clockwise direction so as to roll up the steel wire 98 to lift up the elevator 12. When the opening 40 of the elevator and the opening 42 of the third hallway 24 are in communication with each other, the contact plate 114 provided on the lateral side of the elevator 12 will be in contact with the motor switch 116 to stop the motor 92 and the elevator 12 at once, and thus the frightened mouse in the elevator 12 will at once bump away the turning plate and flee into the third hallway 24. By continuing bumping away the turning plates 48, 50 as above described, the frightened mouse will flee into the inner room 52 and further fall into the confinement cell 58 in the lower compartment through the port 56 while bumping away the turning plate 54 set in said port 56. In the above last paragraph's description, before entering into the inner room 52, the mouse must inevitably touch the pedal switch 46 to switch on the motor 92, which belongs to the automatic control mechanism 16 for the elevator 12, and the motor 60 which belongs to the automatic control mechanism 18 for the lifting plate 14. However, at this moment, due to the driven pulley 64a engaging with the driving pulley 64b in the first clutching-pulley 64, the driven pulley 64a will therefore turn to roll up the steel wire 78 to lift up the lifting plate 14 by which the front entrance 28 of the first hallway will be opened. As soon as the contact plate 118 provided on the lifting plate 14 is in contact with the motor switch 120, the motor 60 and the lifting plate 14 will be immediately stopped and said lifting plate 14 will then lay on the front side of the control rod 72. Meanwhile, because the tensive force on the front end of the lever 102 of the electric switch 100, resulted from the connecting wire 106 of the lifting plate 14, disappears, said front end of the lever 102 will shift upward to make the spring plate 104 capable of contact with the upper spring plate 112. The motor 92 which belongs to the control mechanism for the elevator 12 will then operate and be caused to rotate the pulley 96 in a counterclockwise direction so as to loosen the steel wire 98 and lower the elevator 12. While lowering to its original position, the contact plate 114 provided on the lateral side of the elevator 12 will be in contact with the motor switch 112 to stop the motor 92 and the elevator 12 immediately. In such a performance, the animal-trapping device of this invention will restore its function for trapping an animal once again. Therefore, this device may repeat its operating cycle all over again and catch lots of mice by automatic operating in continuity.

While certain preferred embodiments of the invention have been illustrated by way of examples in the drawings and particularly described, it will be readily understood that various modifications may be made in the structure and arrangements within the scope of the invention.

I claim:

1. An automatic animal-trapping device comprising lower and upper compartments,
    said lower compartment including
        a first hallway having an entrance to the animal-trapping device,
        a second hallway communicating with said first hallway,
    said upper compartment including
        a third hallway,
    an elevator for transporting the caught animal from said second to said third hallway,
        a first automatic control mechanism to operate said elevator,
    a pedal switch set within said elevator to operate said automatic control mechanism to raise said elevator,
    a lifting plate controlling said entrance at said first hallway,
    a second automatic control mechanism to operate said lifting plate,
    a first clutching-pulley having a steel wire wound around said first clutching-pulley and said steel wire connected at its other end to the top side of said lifting plate,
    a control mechanism having a control rod attached thereto,
    a second clutching-pulley having a steel wire wound around said second clutching-pulley and said last mentioned steel wire connected at its other end to said control rod of said control mechanism to retract said control rod from a position interfering with downward movement of said lifting plate,
    a transmission set connected to said first and said second clutching-pulleys,
    and a motor connected to drive said pulleys through said transmission set.

2. The automatic animal-trapping device of claim 1 further characterized by
    a compressed coil spring provided on an extended portion of said control rod for rebounding said control rod back to its original position of interfering with downward movement of said lifting plate.

3. The automatic animal-trapping device of claim 1 or 2 further characterized by
    said first clutching-pulley including a driving pulley and a driven pulley adapted to engage in a clutching arrangement,
    a ring on said driven pulley,
    a connecting rod connected to said ring,
    a crank pivotable to disengage said driven pulley from said driving pulley,
    linkage connected to said crank to pivot said crank to disengage said driven pulley upon a downward force being applied to said linkage,
    and a tension spring connected to said ring to pull said driven pulley back to its engaging position with said driving pulley when the downward force on said linkage disappears.

4. An automatic animal-trapping device comprising lower and upper compartments,
    said lower compartment including
        a first hallway having an entrance to the animal-trapping device,
        a second hallway communicating with said first hallway,
    said upper compartment including a third hallway,
    an elevator for transporting the caught animal from said second to said third hallway,
    a first automatic control mechanism to operate said elevator,
    a pedal switch set within said elevator to operate said automatic control mechanism to raise said elevator,
    a lifting plate controlling said entrance at said first hallway,
    a second automatic control mechanism to operate said lifting plate,
    said first automatic control mechanism including
    a motor for said first automatic control mechanism, a transmission gear set operated by said motor for said first automatic control mechanism,
    a pulley having a steel wire wound around said pulley and having the other end of said last mentioned steel wire connected to an upper part of said elevator,
    and an electric switch connected to operate said last-mentioned motor to operate said pulley through said last mentioned transmission gear set to rotate said pulley in either a clockwise or counterclockwise direction in order to raise or lower said elevator.

5. The automatic animal-trapping device of claim 4 further characterized by
    a contact plate on a lateral side of said elevator,
    an upper motor switch and a lower motor switch located for contact with said contact plate at opposite ends of travel of said elevator,
    said upper and lower motor switches connected in said first automatic control mechanism for said elevator to stop said elevator and said motor of said first automatic control mechanism.

6. An automatic animal-trapping device comprising lower and upper compartments,
    said lower compartment including
        a first hallway having an entrance to the animal-trapping device,
        a second hallway communicating with said first hallway,
    said upper compartment including
        a third hallway,
    an elevator for transporting the caught animal from said second to said third hallway,
    a first automatic control mechanism to operate said elevator,
    a pedal switch set within said elevator to operate said automatic control mechanism to raise said elevator,
    a lifting plate controlling said entrance at said first hallway,
    a second automatic control mechanism to operate said lifting plate,
    said second automatic control mechanism including
    a motor switch connected to said motor,
    a contact plate attached to said lifting plate,
    said motor switch and said contact plate located to make contact with each other when said lifting plate has been raised to a height at which said motor and said lifting plate are stopped.

7. An automatic animal-trapping device comprising lower and upper compartments,
said lower compartment including
a first hallway having an entrance to the animal-trapping device,
a second hallway communicating with said first hallway,
said upper compartment including
a third hallway,
an elevator for transporting the caught animal from said second to said third hallway,
a first automatic control mechanism to operate said elevator,
a pedal switch set within said elevator to operate said automatic control mechanism to raise said elevator,
a lifting plate controlling said entrance at said first hallway,
a second automatic control mechanism to operate said lifting plate,
turning plates capable of opening and closing in one direction only provided between said first and second hallways and also between said second hallway and an entrance to said elevator.

8. The automatic animal-trapping device of claim 7 further characterized by
said third hallway including an inner room,
a confinement area in said lower compartment,
a port having a turning plate in said inner room leading directly to said confinement area in said lower compartment.

9. An automatic animal-trapping device comprising lower and upper compartments,
said lower compartment including
a first hallway having an entrance to the animal-trapping device,
a second hallway communicating with said first hallway,
said upper compartment including
a third hallway,
an elevator for transporting the caught animal from said second to said third hallway,
a first automatic control mechanism to operate said elevator,
a pedal switch set within said elevator to operate said automatic control mechanism to raise said elevator,
a lifting plate controlling said entrance at said first hallway,
a second automatic control mechanism to operate said lifting plate,
a second pedal switch located within said third hallway connected to said automatic control mechanisms to lower said elevator and raise said lifting plate.

* * * * *